United States Patent
Ihab et al.

(10) Patent No.: US 10,969,515 B2
(45) Date of Patent: Apr. 6, 2021

(54) CONTACTLESS DATA COMMUNICATION IN CT SYSTEMS

(71) Applicant: Smiths Detection, LLC, Newark, CA (US)

(72) Inventors: Elzind Ihab, San Jose, CA (US); Samit Basu, Newark, CA (US)

(73) Assignee: SMITHS DETECTION INC., Edgewood, MD (US)

( * ) Notice: Subject to any disclaimer, the term of this patent is extended or adjusted under 35 U.S.C. 154(b) by 75 days.

(21) Appl. No.: 15/928,524

(22) Filed: Mar. 22, 2018

(65) Prior Publication Data
US 2018/0275308 A1     Sep. 27, 2018

Related U.S. Application Data

(60) Provisional application No. 62/476,087, filed on Mar. 24, 2017.

(51) Int. Cl.
| | | |
|---|---|---|
| G01V 5/00 | (2006.01) | |
| G01T 1/29 | (2006.01) | |
| H04B 5/00 | (2006.01) | |
| H04L 27/26 | (2006.01) | |

(52) U.S. Cl.
CPC ............ G01V 5/005 (2013.01); G01T 1/2985 (2013.01); H04B 5/0031 (2013.01); H04B 5/0075 (2013.01); H04L 27/2601 (2013.01)

(58) Field of Classification Search
CPC ...... A61B 6/56; H04B 5/0012; H04B 5/0031; H01F 2038/143
See application file for complete search history.

(56) References Cited

U.S. PATENT DOCUMENTS

| | | | |
|---|---|---|---|
| 5,579,357 A | 11/1996 | Harrison | |
| 6,607,354 B1 | 8/2003 | Klapatch et al. | |
| 7,221,159 B2 | 5/2007 | Griffiths et al. | |
| 7,466,704 B2 * | 12/2008 | Kalkunte | ............... H04L 43/00 370/392 |
| 7,634,046 B2 * | 12/2009 | Krumme | .................. A61B 6/56 378/101 |

(Continued)

FOREIGN PATENT DOCUMENTS

EP     2932901 A1     10/2015

OTHER PUBLICATIONS

International Search Report and Written Opinion of the International Searching Authority for International Application No. PCT/US 18/23768, dated Aug. 3, 2018.

(Continued)

*Primary Examiner* — Kenneth J Malkowski
(74) *Attorney, Agent, or Firm* — Armstrong Teasdale LLP

(57) ABSTRACT

A CT imaging system for imaging an object is provided. The CT imaging system includes a stationary component, a rotating component configured to rotate with respect to the stationary component, a first conductive line coupled to the stationary component, and a second conductive line coupled to the rotating component, wherein the first and second conductive lines are positioned proximate one another such that inductive crosstalk between the first and second conductive lines provides a contactless communication channel for communicating data between the stationary component and the rotating component.

18 Claims, 7 Drawing Sheets

(56) References Cited

U.S. PATENT DOCUMENTS

| | | | |
|---|---|---|---|
| 7,717,619 B2* | 5/2010 | Katcha | G08C 17/04 |
| | | | 378/197 |
| 2003/0214421 A1 | 11/2003 | Schilling | |
| 2003/0224784 A1 | 12/2003 | Hunt et al. | |
| 2006/0072800 A1 | 4/2006 | Bernard Deman et al. | |
| 2007/0035883 A1* | 2/2007 | Katcha | A61B 6/56 |
| | | | 360/281.8 |
| 2009/0176450 A1* | 7/2009 | Chow | H01L 23/48 |
| | | | 455/41.1 |
| 2013/0259202 A1 | 10/2013 | Sloutsky et al. | |
| 2015/0162983 A1 | 6/2015 | Poisel et al. | |
| 2016/0181012 A1* | 6/2016 | Poehmerer | H04B 5/0031 |
| | | | 333/24 C |
| 2016/0211701 A1 | 7/2016 | Nils | |
| 2016/0317115 A1 | 11/2016 | Shippen | |
| 2017/0105697 A1* | 4/2017 | Model | A61B 6/032 |

OTHER PUBLICATIONS

Supplementary European Search Report for related EP Patent Application No. 18772303.6, dated Nov. 30, 2020, 12 pages.

* cited by examiner

CONTACTLESS DATA COMMUNICATION IN CT SYSTEMS

CROSS-REFERENCE TO RELATED APPLICATIONS

This application claims the benefit of priority to U.S. Provisional Patent Application No. 62/476,087, filed on Mar. 24, 2017, the entire contents and disclosure of which are hereby incorporated by reference herein in their entirety.

BACKGROUND

The embodiments described herein relate generally to CT imaging systems, and more particularly, to contactless data communication for CT imaging systems.

In some computed tomography (CT) imaging systems, an x-ray source projects a fan-shaped beam that is collimated to lie within an X-Y plane of a Cartesian coordinate system and generally referred to as an "imaging plane". The x-ray beam passes through an object being imaged. The beam, after being attenuated by the object, impinges upon an array of radiation detectors. The intensity of the attenuated radiation beam received at the detector array is dependent upon the attenuation of the x-ray beam by the object. Each detector element of the array produces a separate electrical signal that is a measurement of the beam intensity at each detector location. The intensity measurements from all the detectors are acquired separately to produce a transmission profile and reconstruct an image of the object.

At least some known CT systems include a gantry that rotates within a stationary housing. To control operation of the CT system, data is communicated between the rotating gantry and stationary housing. For example, imaging data acquired by detectors on the gantry may be communicated to a computing device for processing (e.g., image reconstruction). To communicate between the gantry and housing, at least some known CT systems use an optical communication system (e.g., a laser transmitter and an optical receiver). Further, at least some known CT systems use capacitive coupling between a transmitter on one of the gantry and the housing and a receiver on the other of the gantry and the housing. However, these known communication systems may be unidirectional, and may also require relatively high tolerances for proper operation.

BRIEF SUMMARY

In one aspect, a CT imaging system for imaging an object is provided. The CT imaging system includes a stationary component, a rotating component configured to rotate with respect to the stationary component, a first conductive line coupled to the stationary component, and a second conductive line coupled to the rotating component, wherein the first and second conductive lines are positioned proximate one another such that inductive crosstalk between the first and second conductive lines provides a contactless communication channel for communicating data between the stationary component and the rotating component.

In another aspect, a method for contactless data communication in a CT imaging system is provided. The method includes coupling a first conductive line to a stationary component of the CT imaging system, coupling second conductive line to a rotating component of the CT imaging system, wherein the second conductive line is positioned proximate the first conductive line, and wherein the rotating component is configured to rotate with respect to the stationary component, and communicating data between the stationary component and the rotating component using a contactless communication channel, wherein inductive crosstalk between the first and second conductive lines provides the contactless communication channel.

In yet another aspect, a contactless communication system is provided. The contactless communication system includes a first conductive line, and a second conductive line located proximate the first conductive line, wherein inductive crosstalk between the first and second conductive lines provides a contactless communication channel for communicating data between the first and second conductive lines, and wherein orthogonal frequency-division multiplexing (OFDM) is used as the physical layer to communicate data over the contactless communication channel.

DETAILED DESCRIPTION

The systems and methods described herein provide a contactless communication system for a CT imaging system. At least one first conductive line is coupled to a stationary component of the CT imaging system. At least one second conductive line is coupled to a rotating component of the CT imaging system. Inductive crosstalk between the first and second conductive lines provides a contactless communication channel that may be used to communicate data bi-directionally between the stationary component and the rotating component.

Figure 1:
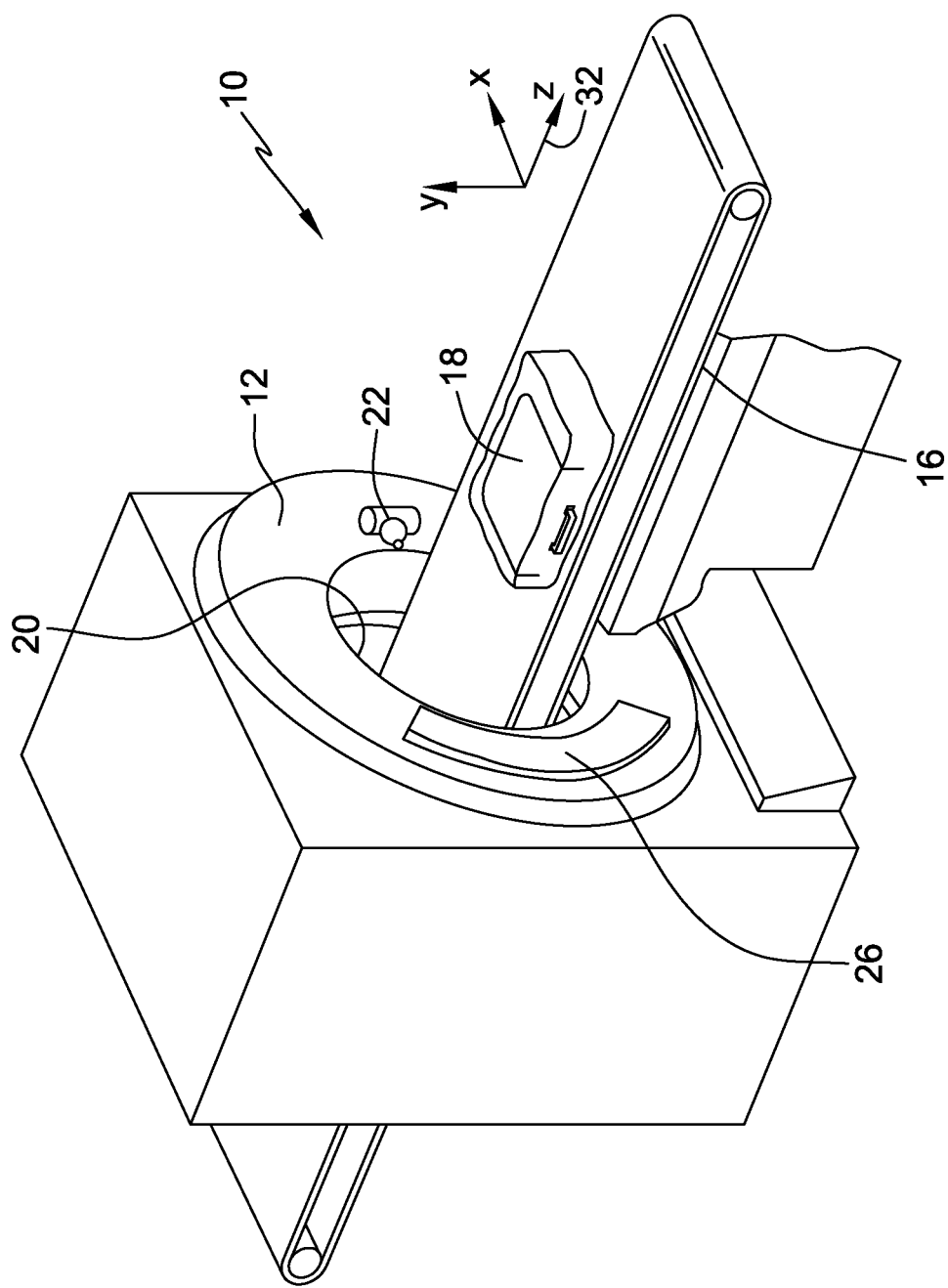
FIG. 1 is a perspective view of an exemplary CT imaging system.
Figure 2:
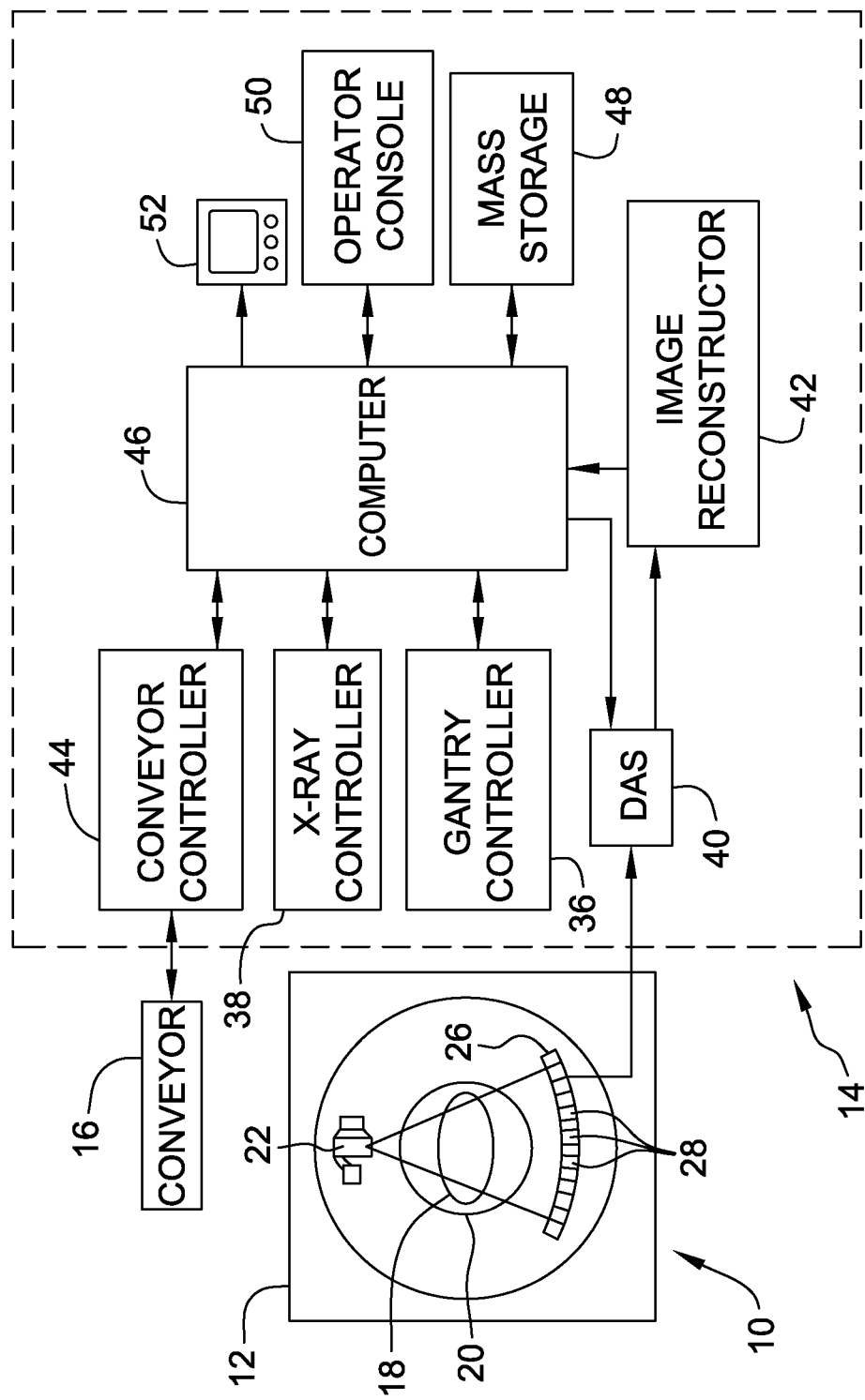
FIG. 2 is a schematic diagram of the CT imaging system shown in FIG. 1.

Referring now to FIGS. 1 and 2, a computed tomography (CT) imaging system 10 is shown. CT imaging system 10 is shown having a gantry 12, which is representative of a CT scanner, a control system 14, and a motorized conveyor belt 16 for positioning an object 18, such as a piece of luggage, in a gantry opening 20 defined through gantry 12. Gantry 12 includes an x-ray source 22 that projects a fan beam of x-rays 24 toward a detector array 26 on the opposite side of gantry 12. Detector array 26 is formed by detector elements 28, which are radiation detectors that each produce a signal having a magnitude that represents and is dependent on the intensity of the attenuated x-ray beam after it has passed through object 18 being imaged. During a helical scan that acquires x-ray projection data, gantry 12 along with the x-ray source 22 and detector array 26 rotate within an x-y plane and around object 18 about a center of rotation, while object 18 is moved through gantry 12 in a z-direction 32 perpendicular to the x-y plane of rotation. In the exemplary embodiment, detector array 26 includes a plurality of detector rings each having a plurality of detector elements 28, the detector rings having an angular configuration corresponding to x-ray source 22.

Gantry 12 and x-ray source 22 are controlled by control system 14, which includes a gantry controller 36, an x-ray controller 38, a data acquisition system (DAS) 40, an image reconstructor 42, a conveyor controller 44, a computer 46, a mass storage system 48, an operator console 50, and a display device 52. Gantry controller 36 controls the rotational speed and position of gantry 12, while x-ray controller 38 provides power and timing signals to x-ray source 22, and data acquisition system 40 acquires analog data from detector elements 28 and converts the data to digital form for subsequent processing. Image reconstructor 42 receives the digitized x-ray data from data acquisition system 40 and performs an image reconstruction process that involves filtering the projection data using a helical reconstruction algorithm.

Computer 46 is in communication with the gantry controller 36, x-ray controller 38, and conveyor controller 44 whereby control signals are sent from computer 46 to controllers 36, 38, 44 and information is received from controllers 36, 38, 44 by computer 46. Computer 46 also provides commands and operational parameters to data acquisition system 40 and receives reconstructed image data from image reconstructor 42. The reconstructed image data is stored by computer 46 in mass storage system 48 for subsequent retrieval. An operator interfaces with computer 46 through operator console 50, which may include, for example, a keyboard and a graphical pointing device, and receives output, such as, for example, a reconstructed image, control settings, and other information, on display device 52.

Communication between the various system elements of FIG. 2 is depicted by arrowhead lines, which illustrate a means for either signal communication or mechanical operation, depending on the system element involved. Communication amongst and between the various system elements may be obtained through a hardwired or a wireless arrangement. For example, inductive crosstalk between two conductive lines may be used as a communication channel, as described herein. Computer 46 may be a standalone computer or a network computer and may include instructions in a variety of computer languages for use on a variety of computer platforms and under a variety of operating systems. Other examples of computer 46 include a system having a microprocessor, microcontroller, or other equivalent processing device capable of executing commands of computer-readable data or program for executing a control algorithm. In order to perform the prescribed functions and desired processing, as well as the computations therefor (e.g., the execution of filtered back projection, Fourier analysis algorithm(s), the control processes prescribed herein, and the like), computer 46 may include, but not be limited to, a processor(s), memory, storage, register(s), timing, interrupt(s), communication interfaces, and input/output signal interfaces, as well as combinations including at least one of the foregoing. For example, computer 46 may include input signal filtering to enable accurate sampling and conversion or acquisitions of such signals from communications interfaces. As described above, exemplary embodiments can be implemented through computer-implemented processes and apparatuses for practicing those processes.

Figure 3:
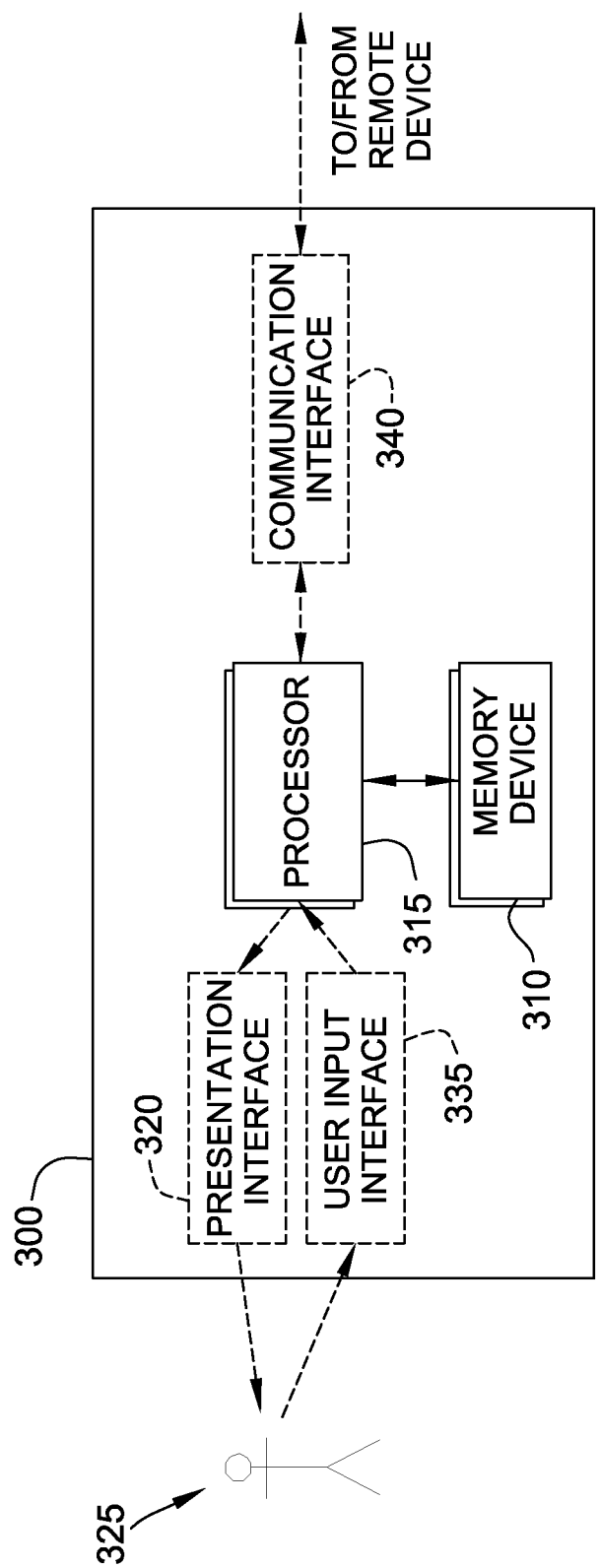
FIG. 3 is a block diagram of an exemplary computing device that may be used with the CT imaging system shown in FIGS. 1-3.

FIG. 3 is a block diagram of a computing device 300 that may be used to reconstruct an image of object 18, as described herein. Computing device 300 may be implemented as part of control system 14 or may be a separate computing device in communication with CT imaging system 10 or another imaging system. Computing device 300 includes at least one memory device 310 and a processor 315 that is coupled to memory device 310 for executing instructions. In some embodiments, executable instructions are stored in memory device 310. In the exemplary embodiment, computing device 300 performs one or more operations described herein by programming processor 315. For example, processor 315 may be programmed by encoding an operation as one or more executable instructions and by providing the executable instructions in memory device 310.

Processor 315 may include one or more processing units (e.g., in a multi-core configuration). Further, processor 315 may be implemented using one or more heterogeneous processor systems in which a main processor is present with secondary processors on a single chip. In another illustrative example, processor 315 may be a symmetric multi-processor system containing multiple processors of the same type. Further, processor 315 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), graphics processing units (GPU), and any other circuit capable of executing the functions described herein.

In the exemplary embodiment, memory device 310 is one or more devices that enable information such as executable instructions and/or other data to be stored and retrieved. Memory device 310 may include one or more computer-readable media, such as, without limitation, dynamic random access memory (DRAM), static random access memory (SRAM), a solid state disk, and/or a hard disk. Memory device 310 may be configured to store, without limitation, application source code, application object code, source code portions of interest, object code portions of interest, configuration data, execution events and/or any other type of data. Further, reference templates may be stored on memory device 310.

In the exemplary embodiment, computing device 300 includes a presentation interface 320 that is coupled to processor 315. Presentation interface 320 presents information to a user 325. For example, presentation interface 320 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 320 includes one or more display devices.

In the exemplary embodiment, computing device 300 includes a user input interface 335. User input interface 335 is coupled to processor 315 and receives input from user 325. User input interface 335 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 320 and user input interface 335.

Computing device 300, in the exemplary embodiment, includes a communication interface 340 coupled to processor 315. Communication interface 340 communicates with one or more remote devices (e.g., in some embodiments, CT imaging system 10). To communicate with remote devices, communication interface 340 may include, for example, a wired network adapter, a wireless network adapter, and/or a mobile telecommunications adapter.

To control operation of CT imaging system 10, data is communicated between one or more static components (e.g., a stationary housing for gantry 12) and one or more rotating components (e.g., gantry 12 itself). As used herein, a 'rotating component' refers to a component that rotates relative to a 'static component'. In the systems and methods described herein, inductive crosstalk is utilized to communicate data between static components and rotating components. This enables contactless communications between rotating and static components, as described herein.

In the exemplary embodiment, communication utilizing inductive crosstalk is accomplished using at least two conductors, or lines. At least one first line is located on a static component of CT imaging system 10, and at least one second line is located on a rotating component of CT imaging system 10. Notably, first and second lines do not physically contact one another, but data is communicated between first and second lines using inductive crosstalk.

Figure 4:
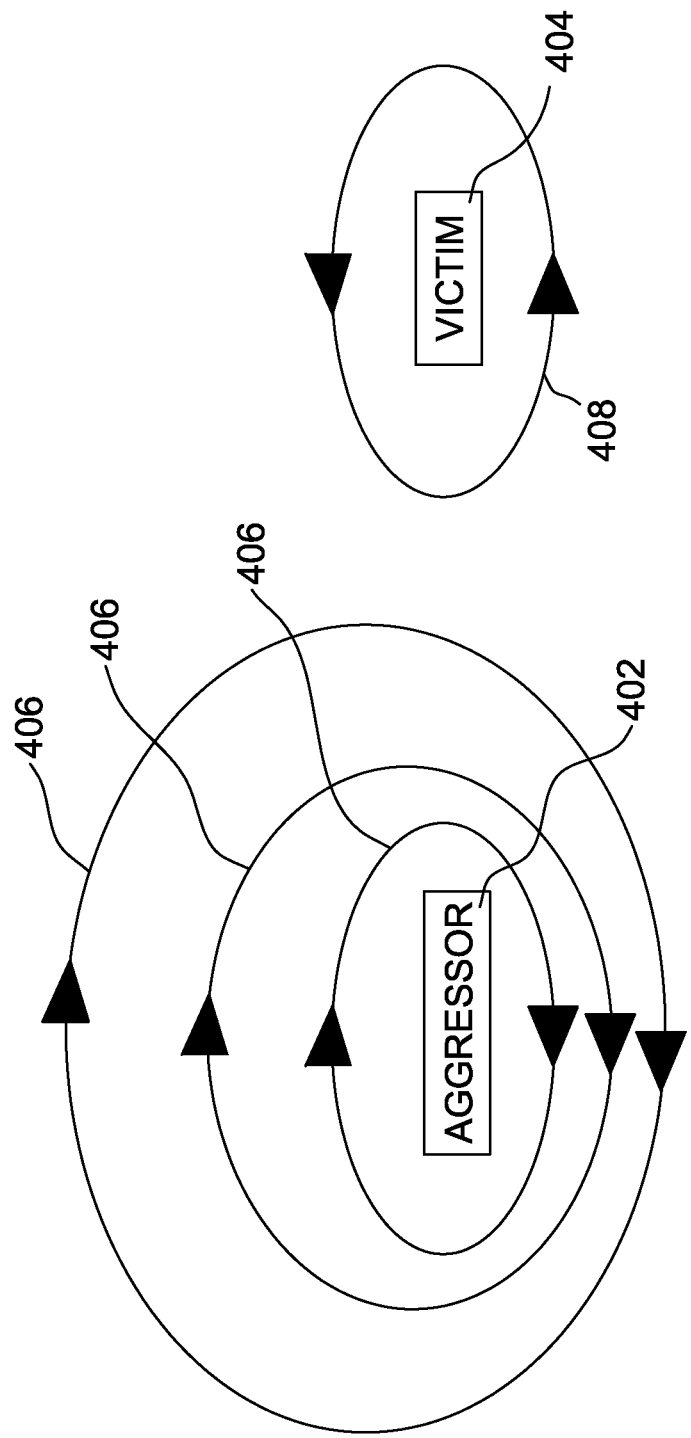
FIG. 4 is a schematic diagram illustrating electromagnetic interactions between a first conductive line and a second conductive line.

FIG. 4 is a schematic diagram illustrating electromagnetic interactions between a first conductive line 402 and a second conductive line 404. For example, as a first current travels along first conductive line 402, a first magnetic field 406 is generated around first conductive line 402. First magnetic field 406 in turn induces a second magnetic field 408 around second conductive line 404. As shown in FIG. 4, first magnetic field 406 is in a direction opposite second magnetic field 408 (e.g., if first magnetic field 406 is clockwise, second magnetic field 408 is counterclockwise). Second magnetic field 408 causes a second current to flow through second conductive line 404.

In this example, because the first current in first conductive line 402 causes generation of the second current in second conductive line 404, first conductive line 402 may be referred to as the 'aggressor' line, and second conductive line 404 may be referred to as the 'victim' line. Of course, those of skill in the art will appreciate that an initial current in second conductive line 404 will generate a subsequent current in first conductive line 402, in which case second conductive line 404 is the aggressor line and first conductive line 402 is the victim line.

Because first and second conductive lines 402 and 404 do not physically contact one other (either directly or through other conductive components), first and second conductive lines 402 and 404 do not have a common ground. As such, there is no capacitive crosstalk between first and second conductive lines 402 and 404. Rather, there is only inductive crosstalk between first and second conductive lines 402 and 404.

There are two components of inductive crosstalk between first and second conductive lines 402 and 404: near end crosstalk and far end crosstalk. The near end crosstalk between first and second conductive lines 402 and 404 can be represented as:

$$NEXT = \frac{1}{4}\left(\frac{C_M}{C_L} + \frac{L_M}{L_L}\right)$$ (Equation 1)

where $C_M$ is the mutual capacitance between first and second conductive lines 402 and 404, $C_L$ is the capacitance per unit length of first and second conductive lines 402 and 404, $L_M$ is the mutual inductance between first and second conductive lines 402 and 404, and $L_L$ is the inductance per unit length of first and second conductive lines 402 and 404.

The far end crosstalk between first and second conductive lines 402 and 404 can be represented as:

$$FEXT = \frac{1}{2}\left(\frac{length}{vel * t_{rise}}\right)\left(\frac{C_M}{C_L} - \frac{L_M}{L_L}\right)$$ (Equation 2)

where 'length' is the coupling length of first and second conductive lines 402 and 404, $t_{rise}$ is the risetime of the signal on the aggressor conductive line (i.e., first conductive line 402), $C_M$ is the mutual capacitance between first and second conductive lines 402 and 404, $C_L$ is the capacitance per unit length of first and second conductive lines 402 and 404, $L_M$ is the mutual inductance between first and second conductive lines 402 and 404, and $L_L$ is the inductance per unit length of first and second conductive lines 402 and 404.

As can be seen from Equation 1, the near end crosstalk does not depend on $t_{rise}$. Further, the near end crosstalk is always a positive value. In contrast, as can be seen from Equation 2, the far end crosstalk does depend on $t_{rise}$. Further, if the ratios of capacitances and inductances are equal, the far end crosstalk cancels out. This occurs if all of the magnetic field lines are contained within a homogenous dielectric material.

The total crosstalk is the superposition of the near end cross talk and the far end crosstalk. Further, the near end crosstalk results in a flat magnitude variation on the communication channel, and the far end crosstalk contributes to distortion in the flatness of the communication channel.

Figure 5:
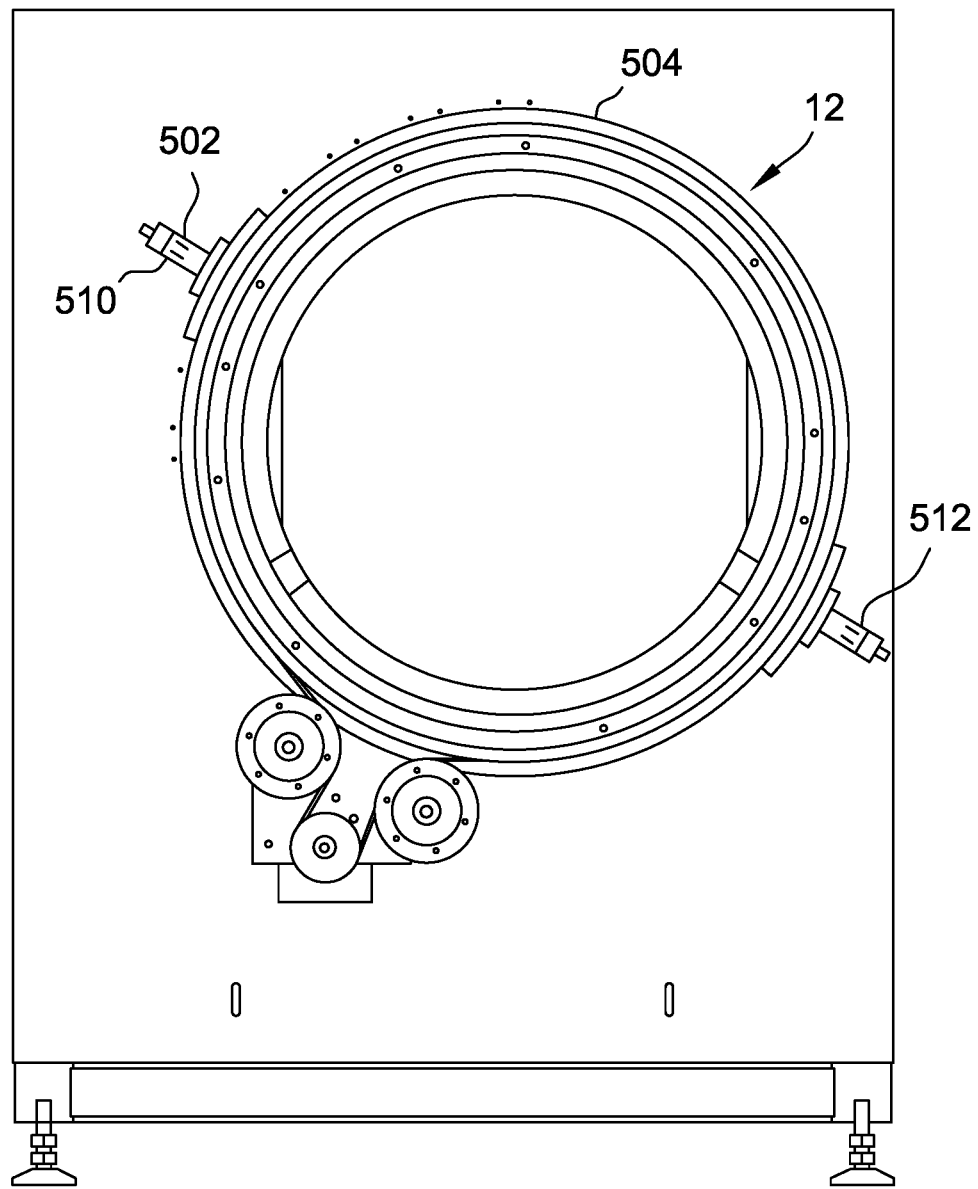
FIG. 5 is a front view of the CT imaging system shown in FIG. 1.
Figure 6:
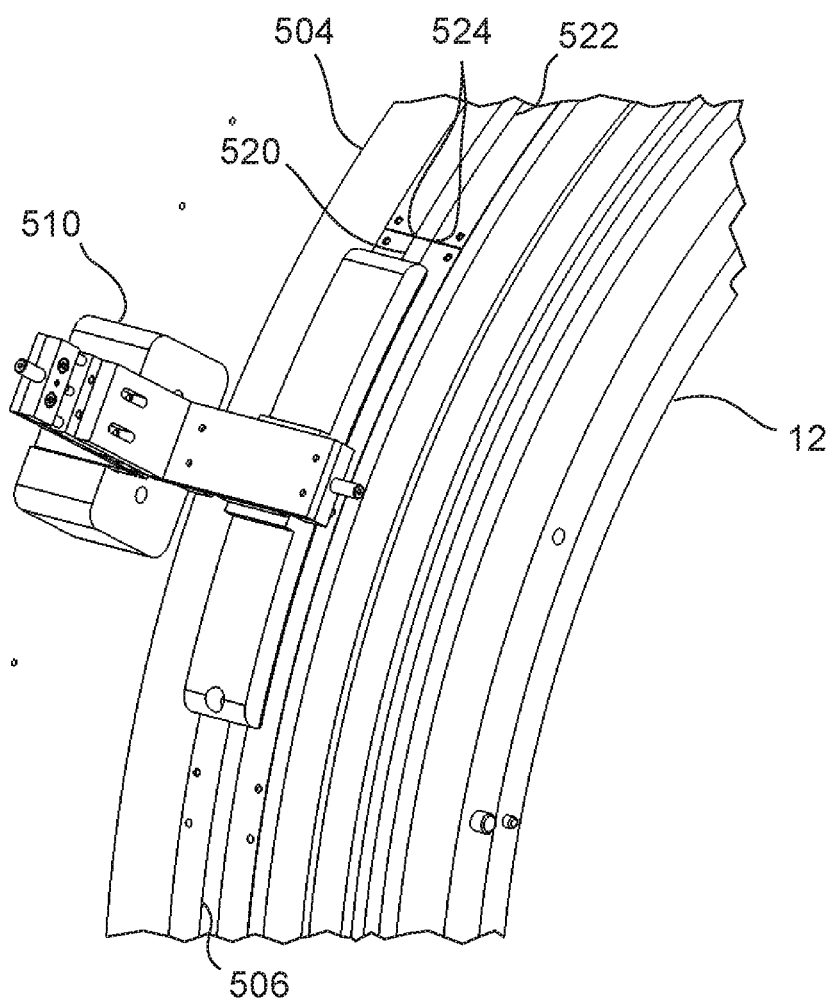
FIG. 6 is a perspective view of a portion of the CT imaging system shown in FIG. 1.
Figure 7:
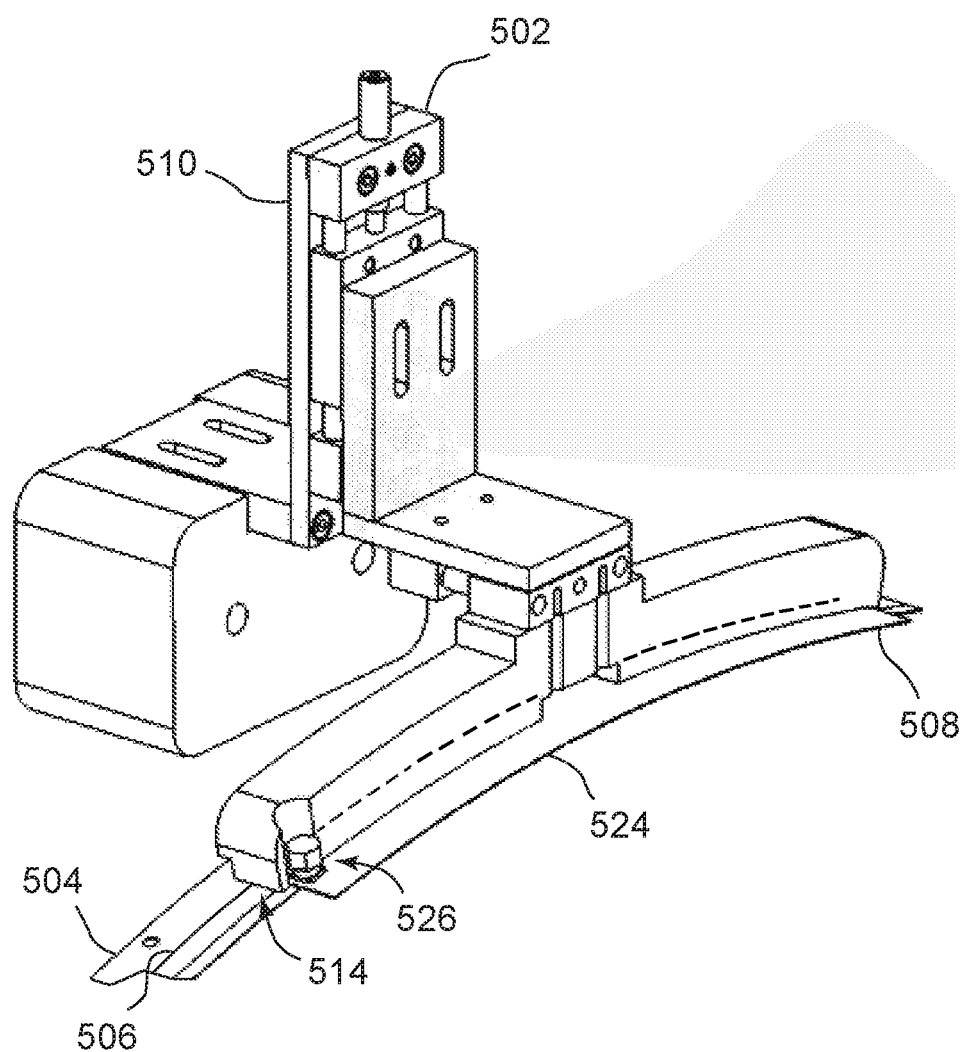
FIG. 7 is another perspective view of a portion of the CT imaging system shown in FIG. 1.

Turning now to FIGS. 5-7, one example embodiment of CT imaging system 10 for implementing inductive crosstalk is illustrated. More particularly, FIG. 5 is a front view of a portion of CT imaging system 10, FIG. 6 is a perspective view of a portion of CT imaging system 10, and FIG. 7 is another perspective view of a portion of CT imaging system 10. As shown in FIG. 5, CT imaging system 10 includes a stationary component 502 and a rotating component 504. In the illustrated embodiment, stationary component 502 is embodied as one or more brackets 510, 512. In other embodiments, stationary component 502 may include, for example, a housing or stationary frame of CT imaging system 10. In the illustrated embodiment, rotating component 504 includes, for example, gantry 12 of CT imaging system 10 or a slip ring of CT imaging system 10.

As shown in FIG. 6, a first conductive line 506 is coupled to rotating component 504. First conductive line 506, embodied as two parallel wires 520, 522, extends circumferentially about gantry 12. Moreover, each of wires 520, 522 includes a respective seam 524, at which a first end and a second end of each wire 520, 522 meet come together to close the loop of the wire 520, 522. Seam 524 represents a discontinuity in first conductive line 506, and, accordingly, seam 524 is preferably as small as possible. The size of seam 524 may be limited by the need to ensure completion of the loop of each wire 520, 522. It should be understood that the size of seam 524 is exaggerated in FIG. 6 for clarity.

As shown in FIG. 7, a cut-away view of bracket 510, a second conductive line 508 is coupled to stationary component 502, specifically to bracket 510. Second conductive line 508 is embodied as a wire 524 substantially the same as wire 520, 522 of first conductive line 506, except that wire 524 forms a much smaller loop (i.e., a loop positioned on a bottom surface 514 of bracket 510) and wire 524 is stationary.

First and second conductive lines 506 and 508 are positioned proximate one another, such that inductive crosstalk occurs between first and second conductive lines 506 and 508, as described above. Communication between first and second conductive lines 506 and 508 is bidirectional. Specifically, to communicate data from stationary component 502 to rotating component 504, first conductive line 506 functions as the aggressor and second conductive line 508 functions as the victim. To communicate data from rotating component 504 to stationary component 502, second conductive line 508 functions as the aggressor and first conductive line 506 functions as the victim.

In the exemplary embodiment, orthogonal frequency-division multiplexing (OFDM) is used as the physical layer to communicate over the communication channel between first and second conductive lines 506 and 508 provided by inductive crosstalk. Further, in the exemplary embodiment, communication is accomplished by shifting the WiFi frequency standard (which typically operates in a 5 to 6 Gigahertz (GHz) frequency band) to below the 5 to 6 GHz band. Specifically, OFDM is used to modulate the frequency into the RF band, which results in relatively lower tolerances and allows for bidirectional communication. The error vector magnitude (EVM) of such a configuration may be kept relatively low (e.g., below 1.5%).

As explained above, the inductive crosstalk between first and second conductive lines 506 and 508 has a near end component and a far end component. The far end component of the crosstalk may be reduced by tuning the system and adjusting the mechanical design of the system. Moreover, the discontinuity at seam 524 may be reduced as rotating component 504 is rotated at high speeds. In addition, CT imaging system 10 includes two brackets 510, 512. Each bracket 510, 512 is configured to act as an antenna for CT imaging system 10 to facilitate inductive crosstalk as described herein. In the example embodiment, brackets 510, 512 are positioned opposite one another across CT imaging system 10, or about 180° from one another about the circumference of a frame or housing of CT imaging system 10. Brackets 510, 512 may be otherwise spaced from one another about the circumference the housing of CT imaging system 10.

When the discontinuity at seam 524 is near and/or directly under one bracket 510, acting as the antenna, bracket 510 begins to experience two discontinuous waveforms, causing signal interference. Accordingly, CT imaging system 10 is configured to switch to bracket 512 as the antenna substantially immediately before bracket 510 encounters seam 524, to avoid the discontinuity of the seam 524 disrupting communications. Specifically, in one embodiment, each bracket 510, 512 includes an optical sensor 526 at a leading end thereof (i.e., the end of bracket 510, 512 that will first encounter seam 524). When optical sensor 526 detects seam 524, optical sensor 526 transmits a signal (e.g., to computer 46, shown in FIG. 1) that causes a switch, such that the opposite bracket 510, 512 acts as the antenna (until that opposite bracket encounters seam 524, which triggers another switch).

The embodiments described herein provide a contactless communication system for a CT imaging system. A first conductive line is coupled to a stationary component of the CT imaging system. A second conductive line is coupled to a rotating component of the CT imaging system. Inductive crosstalk between the first and second conductive lines provides a contactless communication channel that may be used to communicate data bi-directionally between the stationary component and the rotating component. Notably, the embodiments described herein are not limited to use with CT imaging systems, but may be used for contactless bi-directional data communication in other implementations.

The systems and methods described herein may be used to detect contraband. As used herein, the term "contraband" refers to illegal substances, explosives, narcotics, weapons, special nuclear materials, dirty bombs, nuclear threat materials, a threat object, and/or any other material that a person is not allowed to possess in a restricted area, such as an airport. Contraband may be hidden within a subject (e.g., in a body cavity of a subject) and/or on a subject (e.g., under the clothing of a subject). Contraband may also include objects that can be carried in exempt or licensed quantities intended to be used outside of safe operational practices, such as the construction of dispersive radiation devices.

A computer, such as those described herein, includes at least one processor or processing unit and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Exemplary embodiments of methods and systems are described above in detail. The methods and systems are not limited to the specific embodiments described herein, but rather, components of systems and/or steps of the methods may be used independently and separately from other components and/or steps described herein. Accordingly, the exemplary embodiment can be implemented and used in connection with many other applications not specifically described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A CT imaging system for imaging an object, said CT imaging system comprising:
    a stationary component;
    a rotating component configured to rotate with respect to said stationary component;
    a second conductive line coupled to said stationary component; and a first conductive line coupled to said rotating component, wherein said first conductive line comprises two parallel wires or two parallel circuit board traces, wherein each of the two parallel wires or two parallel circuit board traces forms a loop extending around a circumference of said rotating component, and wherein said first and second conductive lines are positioned proximate one another such that inductive crosstalk between said first and second conductive lines provides a contactless communication channel for communicating data between said stationary component and said rotating component.

2. A CT imaging system in accordance with claim 1, wherein said stationary component comprises a housing of said CT imaging system.

3. A CT imaging system in accordance with claim 1, wherein said rotating component comprises one of a gantry of said CT imaging system and a slip ring of said CT imaging system.

4. A CT imaging system in accordance with claim 1, wherein the contactless communication channel provides bi-directional communication between said stationary component and said rotating component.

5. A CT imaging system in accordance with claim 1, wherein orthogonal frequency-division multiplexing (OFDM) is the physical layer used to communicate data over the contactless communication channel.

6. A CT imaging system in accordance with claim 1, wherein, to communicate data from said stationary component to said rotating component, said second conductive line functions as an aggressor line and said first conductive line functions as a victim line.

7. A CT imaging system in accordance with claim 1, wherein, to communicate data from said rotating component to said stationary component, said first conductive line functions as a victim line and said first conductive line functions as an aggressor line.

8. A CT imaging system in accordance with claim 1, wherein said CT imaging system further comprises:
a first bracket coupled to said stationary component at a first location; and
a second bracket coupled to said stationary component at a second location spaced from the first location about a circumference defined by said stationary component, wherein said second conductive line comprises a first wire coupled to said first bracket and a second wire coupled to said second bracket.

9. A CT imaging system in accordance with claim 8, wherein the second location is 180° from the first location about the circumference defined by said stationary component.

10. A CT imaging system in accordance with claim 8, wherein said first conductive line defines a discontinuity.

11. A CT imaging system in accordance with claim 10, wherein said first bracket is configured to provide the contactless communication channel, said first bracket comprising an optical sensor configured to sense said discontinuity and, in response to sensing said discontinuity, transmit a signal that causes said second bracket to provide the contactless communication channel.

12. A method for contactless data communication in a CT imaging system, said method comprising:
coupling a second conductive line to a stationary component of the CT imaging system;
coupling a first conductive line to a rotating component of the CT imaging system, wherein the first conductive line includes two parallel wires or two parallel circuit board traces, wherein each of the two parallel wires or two parallel circuit board traces forms a loop extending around a circumference of the rotating component, wherein the second conductive line is positioned proximate the first conductive line, and wherein the rotating component is configured to rotate with respect to the stationary component; and
communicating data between the stationary component and the rotating component using a contactless communication channel, wherein inductive crosstalk between the first and second conductive lines provides the contactless communication channel.

13. A method in accordance with claim 12, wherein coupling a second conductive line comprises coupling the second conductive line to a housing of the CT imaging system.

14. A method in accordance with claim 12, wherein coupling a first conductive line comprises coupling the first conductive line to one of a gantry of the CT imaging system and a slip ring of the CT imaging system.

15. A method in accordance with claim 12, wherein communicating data comprises communicating data bi-directionally between the stationary component and the rotating component.

16. A method in accordance with claim 12, wherein communicating data comprises using orthogonal frequency-division multiplexing (OFDM) as the physical layer to communicate data over the contactless communication channel.

17. A method in accordance with claim 12, wherein communicating data comprises communicating data from the stationary component to the rotating component by using the second conductive line as an aggressor line and using the first conductive line as a victim line.

18. A method in accordance with claim 12, wherein communicating data comprises communicating data from the rotating component to the stationary component by using the first conductive line as an aggressor line and using the second conductive line as a victim line.

* * * * *